M. WUPPER.
FIREPROOF SAFE.
APPLICATION FILED JULY 23, 1917.
1,279,209.
Patented Sept. 17, 1918.
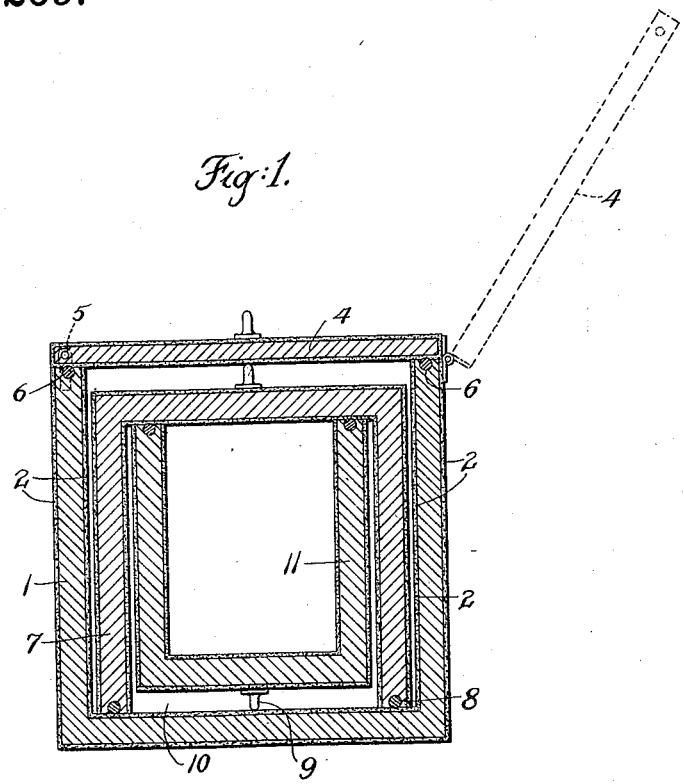
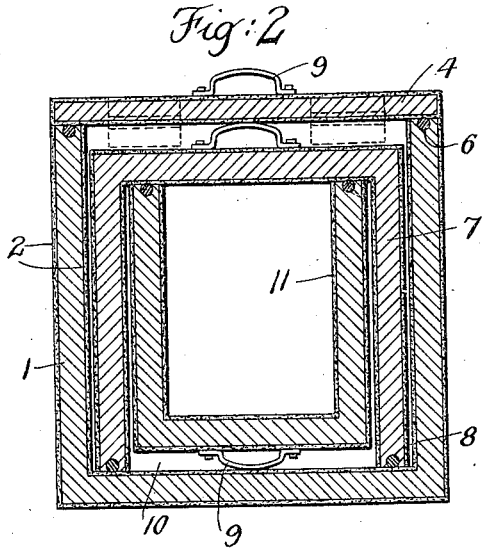
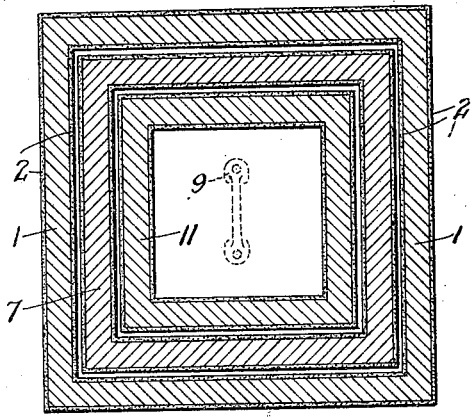
INVENTOR
Mabel Wupper.
BY
Prindle, Wright & Duvall.
ATTORNEY

UNITED STATES PATENT OFFICE.

MABEL WUPPER, OF BROOKLYN, NEW YORK.

FIREPROOF SAFE.

1,279,209.  Specification of Letters Patent.  Patented Sept. 17, 1918.

Application filed July 23, 1917. Serial No. 182,151.

*To all whom it may concern:*

Be it known that I, MABEL WUPPER, of Brooklyn, in the county of Kings and in the State of New York, have invented a certain new and useful Improvement in Fireproof Safes, and do hereby declare that the following is a full, clear, and exact description thereof.

The object of my invention has been to provide a fireproof or fire-resistant safe of such simple and cheap construction as to make it much more generally available than safes of ordinary construction, and to such ends my invention consists in the fireproof safe hereinafter specified.

In the accompanying drawing—

Figure 1 is a side elevation of a safe embodying my invention, the door being shown open in dotted lines, and Figs. 2 and 3 are respectively a longitudinal sectional view and a transverse sectional view of Fig. 1.

While I have chosen as an illustration of my invention the best embodiment thereof known to me, such embodiment is to be regarded only as typical of many possible embodiments, and my invention is not to be confined thereto.

In the illustrated embodiment I have provided an outer box 1 consisting of sides and a bottom, made of wood or similar material fireproofed by chemical treatment in any known manner. Both the outer and inner faces of the wood are protected by a covering 2 of asbestos or other fire-resistant material. A cover 4 is adapted to be secured to the box in any desired manner. I have shown the cover as hinged to the box at one edge and secured thereto at its opposite edge by a fastening 5. The cover, like the body of the box, is constructed of fireproof wood, covered with asbestos. In order to make a fire-tight joint between the cover and the box I have provided a packing on the edge of the box which, in the present instance, consists of a cord or rod of asbestos 6 embedded in a rabbet or groove in the edge of the box.

Within the outer box 1 are nested a number of inner boxes. These inner boxes, like the outer box, are formed of fireproofed wood or similar material and preferably covered inside and out with a coating of asbestos or similar material. The inner boxes are preferably not provided with covers, but each one consists only of sides and a bottom. Next within the outer box 1 is an inner box 7, the open mouth of which is placed against the bottom of the box 1 so that gases and heat would have to travel the depth of the box 1 before reaching the mouth of the box 7. Box 7, like box 1, is provided with a rope or cord of asbestos 8 which is adapted to make a tight joint between the mouth of box 7 and the bottom of box 1. I provide a spacer between the cover of box 1 and the bottom of box 7 which, in the present instance, takes the form of a handle 9, thus providing an air space 10 between the said cover and the said bottom which affords excellent heat insulation between the said parts. Within box 7 I preferably place another box 11 which is constructed precisely like box 7 except that it is small enough to nest within box 7, and thus inner box 11 has its open mouth placed against the bottom of box 7. The papers or other objects to be preserved from fire being within box 11, the gases or heat would have first to enter box 1 under the cover and then travel the depth of box 1 before they could enter box 7 and would then have to travel the depth of box 7 before they could enter box 11.

Fireproofed wood is an excellent material for a fire-resistant safe because wood itself is a good non-conductor of heat, and much better than metal except for the fact that it will char or burn, and the wood of my safe being fireproofed by chemical treatment and being protected by the asbestos, will resist fire sufficiently to make my safe suitable protection for papers in anything but a large fire. My safe is so cheap that it can be used for domestic purposes by many persons who could not otherwise afford any fireproof protection, and it will give sufficient protection to preserve its contents from the ordinary fires in dwellings, which are usually not large.

I claim:

1. A safe comprising an outer box of fire resisting material, and open ended inner boxes of fire resisting material nested within said first mentioned box, each inner box having its open end against the bottom of the box within which it is contained.

2. A safe comprising an outer box of fire resisting material, and open ended inner boxes of fire resisting material nested within said first mentioned box, each inner box having its open end against the bottom of the box within which it is contained, and means for spacing the bottom of the boxes from the walls respectively adjacent them, to provide dead air spaces within the safe.

3. A safe comprising an outer box of fire resisting material, and open ended inner boxes of fire resisting material nested within said first mentioned box, each inner box having its open end against the bottom of the box within which it is contained, each of said inner boxes being provided with a handle on the bottom thereof adapted to engage the wall adjacent such box bottom, to provide dead air spaces within the safe.

In testimony that I claim the foregoing I have hereunto set my hand.

MABEL WUPPER.

Copies of this patent may be obtained for five cents each, by addressing the "Commissioner of Patents, Washington, D. C."